United States Patent [19]
Humphrey et al.

[11] Patent Number: 6,073,028
[45] Date of Patent: Jun. 6, 2000

[54] METHOD AND APPARATUS FOR PROVIDING OUT OF BAND DIALED DIGIT SIGNALING FOR A CALLER INTERFACE IN A FIXED CELLULAR COMMUNICATIONS SYSTEM

[75] Inventors: Chris Humphrey, Clayton; Stephen Guercio, Apex, both of N.C.

[73] Assignee: Ericsson Inc., Research Triangle Park, N.C.

[21] Appl. No.: 08/987,729

[22] Filed: Dec. 9, 1997

[51] Int. Cl.[7] ............................... H04B 1/06; H01S 4/00; H04J 3/24; H04J 3/12

[52] U.S. Cl. ........................ 455/553; 455/466; 455/556; 455/557; 370/349; 370/522

[58] Field of Search ................................... 455/422, 74.1, 455/426, 554, 553, 466, 556, 557, 575, 445, 560; 379/58, 59, 63, 60, 57, 61, 201; 370/349, 522, 524, 352, 353, 354

[56] References Cited

U.S. PATENT DOCUMENTS

| | | |
|---|---|---|
| 4,220,821 | 9/1980 | Lucas . |
| 4,658,096 | 4/1987 | West, Jr. et al. . |
| 4,959,851 | 9/1990 | Tobolski, Jr. et al. . |
| 5,117,450 | 5/1992 | Joglekar et al. . |
| 5,410,728 | 4/1995 | Bertiger et al. . |
| 5,475,735 | 12/1995 | Williams et al. . |
| 5,535,260 | 7/1996 | Zicker et al. . |
| 5,724,656 | 3/1998 | Vo et al. .................................. 455/422 |

FOREIGN PATENT DOCUMENTS

| | | |
|---|---|---|
| 42 40 249 | of 0000 | Germany . |
| WO 95/24103 | 9/1995 | WIPO . |
| WO 96/13948 | 5/1996 | WIPO . |
| WO 97/13381 | 4/1997 | WIPO . |

OTHER PUBLICATIONS

PCT International Search Report, Apr. 20, 1999, PCT/US 98/25951.

"European Digital Cellular Telecommunications System (Phase 2) Support of DTMF via the GSM System", XP–002095606 ETSI 1993, GSM 03.14, Version 4.0.D., Jan. 21, 1993.

Primary Examiner—Wellington Chin
Assistant Examiner—Sheila Smith
Attorney, Agent, or Firm—Jenkens & Gilchrist PC

[57] ABSTRACT

In a fixed cellular telephone system, the taking of a standard wireline telephone set off-hook triggers the establishment of a voice/traffic channel connection between a connected fixed cellular terminal and the cellular system switch. Digits of the telephone number of the party to which the call is directed are entered through the telephone set. These digits are then transmitted by the fixed cellular terminal to the serving cellular network switch as out of band data messages transported over a control channel supported by the established voice/traffic channel connection. The data message digits are then converted to dual tone multi-frequency (DTMF) tones, with the tones processed in a conventional manner to complete the call connection to the called party.

24 Claims, 3 Drawing Sheets

METHOD AND APPARATUS FOR PROVIDING OUT OF BAND DIALED DIGIT SIGNALING FOR A CALLER INTERFACE IN A FIXED CELLULAR COMMUNICATIONS SYSTEM

BACKGROUND OF THE INVENTION

1. Technical Field of the Invention

The present invention relates to cellular telephone systems and, in particular, to a fixed cellular communications system.

2. Description of Related Art

Most people who already have telephone service take their telephone service for granted. They do not realize that in many locations telephone service is a limited resource, and that service providers are often hard pressed to offer that service to all who desire it. Wire-based telephone service providers simply cannot keep up with the recent surge in demand for telephone service. While a large portion of this demand can be traced to the increased use of facsimile machines (which each may require a separate telephone number), an equally significant source of demand can be traced to the increased numbers of people who now want and can afford telephone service. Many times, the increases in population and accompanying increases in demand for telephone service occur in areas where the existing wire-based telephone system infrastructure is either inadequate to handle the increased demand or is completely nonexistent. In such cases, people must wait for the service provider to take the steps needed to establish the required telephone system and catch-up with the demand. Waits as long as several months for a new telephone number, and several years for the installation of wire-based telephone systems having adequate capacity, are not uncommon in heavily populated cities or remote locations.

The planning costs involved in expanding existing or initiating new wire-based telephone systems are enormous when you consider the need for both the acquisition of rights of way and the renovation or construction of the service providing infrastructure (comprising, for example, the switching networks and the laying or stringing of telephone cable). However, before making these expenditures, wire-based telephone service providers must know (or be able to accurately project) exactly where their customers will be located, how many customers will be there, and when they are going to arrive and need the service. It is often the case that service providers act in a reactionary rather than pro-active manner with respect to subscriber demand, and are accordingly not prepared to meet the increases in demand in a timely fashion. This failure is caused primarily by the significant time delay experienced from the point of approving the provision of a wire-based telephone system and its actual installation and placement into operation. These delays have caused telephone service providers to re-think the use of conventional wire-based telephone systems when addressing pending needs for telephone service initiation or expansion.

Cellular telephone systems provide an attractive alternative to conventional wire-based telephone systems, especially in connection with the provision of new or expanded telephone service in heavily populated or remote areas where significant increases in demand are or have been encountered. The expense, aggravation and time involved in acquiring rights of way and establishing the infrastructure to provide telephone service are obviated or substantially reduced with the installation and use of a cellular telephone system. However, the cost to the subscriber on a monthly or per call basis often drastically exceeds the cost for similar activities incurred with respect to wire-based telephone systems. Furthermore, the mobility advantage of cellular telephone systems, which is accounted for in the increased subscriber cost of the service, is often a feature that many telephone service users do not want to pay for or necessarily need.

Accordingly, efforts have been made to couple cellular systems with conventional analog telephones and provide a hybrid telephone system wherein telephone sets are fixed at certain locations as in a wire-based system but instead access the telephone network using radio frequency communications in a cellular environment. Such systems, conventionally referred to as fixed cellular systems, interface a conventional analog telephone set, like that used in wire-based telephone systems, with a radio frequency transceiver, like that used in a mobile telephone, operating within a cellular telephone system. The primary advantages of fixed cellular systems are the elimination of the costs and hassles of acquiring rights of way and laying or stringing telephone cables, and the ease and swiftness with which the system may be installed and made operational. The availability of a fixed cellular system thus offers service providers a tool for quickly reacting to increases in demand at a reasonable provider and subscriber expense.

In spite of the fact that the subscriber's communication device (telephone set) looks like a conventional analog wire-based telephone set, the telephone set in a fixed cellular system unfortunately operates like a cellular mobile telephone, and thus suffers from the known caller interface disadvantages and inconveniences experienced with cellular service. For example, when a call is to be initiated in a fixed cellular system, the phone number must be first completely dialed into in the telephone set through the keypad and then sent to the cellular system for processing. No instantaneous feedback is provided to the caller during the dialing operation concerning the propriety of the entered numbers. The transmission of the dialed number over the cellular network is made only after the activation by the caller of a send button on the keypad. The caller must then wait while the cellular network side of the system selects the voice channel to carry the conversation and completes the call to the called party. The fixed cellular system caller interface accordingly and undesirably operates more slowly relative to, and in a manner completely foreign to the manner of operation experienced in, a conventional wire-based telephone system.

Efforts have been made to have the fixed cellular system mimic operation of the wire-based telephone system with respect to some aspects of the caller interface. For example, it is known to include functionality for simulating at the cellular system interface the dial tone and reorder tones heard on conventional wire-based systems before and during the caller dialing operation. Also, functionality has been provided in fixed cellular systems for automatically generating the send command at the cellular system interface following completion of caller entry of a telephone number. With these features, the analog telephone set connected to a fixed cellular system operates more like a conventional wire-based telephone set than a cellular mobile station. However, this caller interface is slow and does not function to monitor the propriety of the caller dialed numbers during the dialing operation.

Another proposed solution addressing these problems responds to an off-hook condition of the analog telephone set by establishing a cellular traffic channel connection to the cellular network, and applying a dial tone to that traffic channel connection. The applied dial tone prompts the user to enter digits which are then transmitted as dual tone multi-frequency (DTMF) tones over the traffic channel connection for network evaluation and processing. Use of the traffic channel connection is this manner has proven, however, to be a rather unreliable transport mechanism for the dialed digits. The audio path supporting the traffic channel connection further supports the fast associated control channel (FACCH) which is used for carrying certain call related cellular network control communications. When these communications are sent to the network, the audio path must be muted. If the muting occurs at or about the same time that a DTMF tone is being sent to the network over the traffic channel, the sent tone may be mangled or lost, and thus may not be detected by the network. Failure of the call set-up then results. A solution to this problem is needed.

SUMMARY OF THE INVENTION

A fixed cellular network in accordance with the present invention includes a conventional standard telephone set interfaced with a cellular telephone network through a fixed cellular terminal using a radio frequency air interface. The cellular telephone network includes a mobile switching center and at least one base station operating in radio frequency communication with the fixed cellular terminal. When the standard telephone set is taken off-hook by a caller to initiate a call, this event is detected by the fixed cellular terminal and a call set-up signal is sent to the mobile switching center over a first control channel of the cellular radio frequency air interface. Responsive to the receipt of the call set-up signal, the mobile switching center selects a voice/traffic channel of the radio frequency air interface to carry the initiated call between the mobile switching center and the fixed cellular terminal. Digits of the telephone number for the party to be called that are entered by the caller are then transmitted by the fixed cellular terminal to the mobile switching center in data messages sent over a second control channel. In one embodiment of the present invention the second control channel comprises a logical control channel (such as a fast associated control channel FACCH) that is also supported by the voice/traffic channel. The sent digits are then converted to dual tone multi-frequency (DTMF) tones, with the tones processed in a conventional manner to complete the call connection to the dialed party.

BRIEF DESCRIPTION OF THE DRAWINGS

A more complete understanding of the method and apparatus of the present invention may be obtained by reference to the following Detailed Description when taken in conjunction with the accompanying Drawings wherein.

DETAILED DESCRIPTION OF THE DRAWINGS

Figure 1:
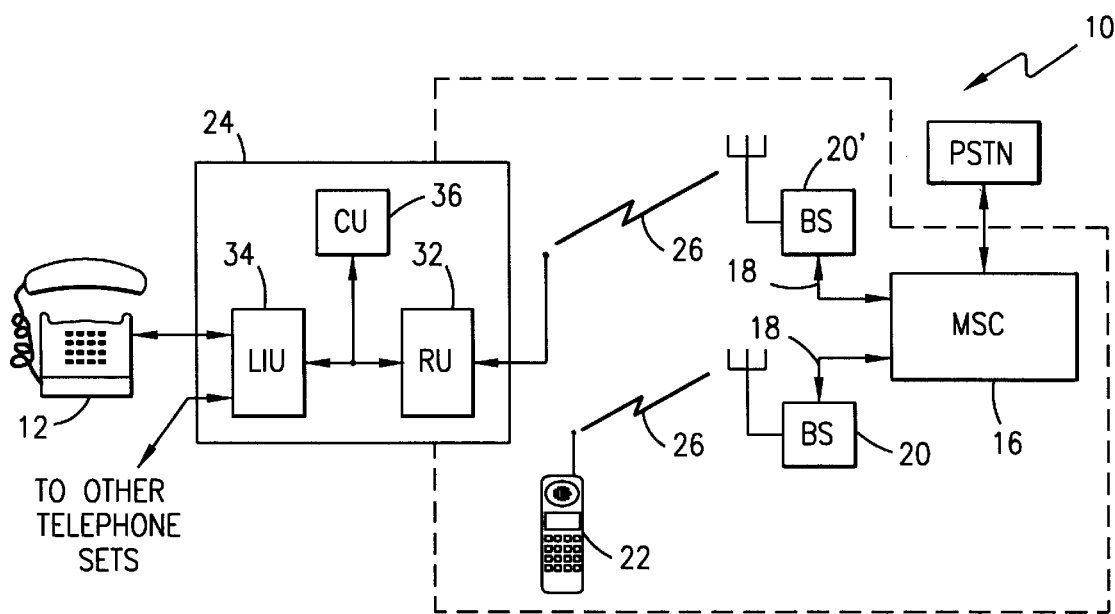
FIG. 1 is a block diagram of a fixed cellular telephone system.

Reference is now made to FIG. 1 wherein there is shown a block diagram of a fixed cellular telephone system 10 in accordance with the present invention wherein a standard telephone set 12 of the dual tone multi-frequency (DTMF) tone dial variety is connected for operation to a cellular telephone network 14. The cellular telephone network 14 comprises a mobile switching center (MSC) 16 connected by communications links 18 to a plurality of base stations (BS) 20. The connection between the standard telephone set 12 and the cellular telephone network 14 is made through a fixed cellular terminal 24 operating to establish radio frequency communications links with a proximately located base station 20'.

The radio frequency communications links established between the base stations 20 and any cellular mobile stations 22, and between the base station 20' and the fixed cellular terminal 24 are effectuated over an air interface 26 supporting both plural logical control channels (CC) and plural logical traffic channels (TC). The control channels comprise bi-directional communications channels for carrying command and control signals between the base stations 20 and the mobile stations 22, and between the base station 20' and the fixed cellular terminal 24. The voice channels, on the other hand, comprise bi-directional communications channels for carrying voice communications between the base stations 20 and the mobile stations 22, and between the base station 20' and the fixed cellular terminal 24. Any type of cellular network air interface 26 that provides for both control and voice channels may be utilized by the cellular telephone network 14, including those air interfaces specified for use in the well known D-AMPS and GSM cellular telephone systems.

The fixed cellular terminal 24 operates as an interface between one or more standard telephone sets 12 and the cellular network 14. When operable as a multi-line terminal, the fixed cellular terminal 24 functions like a private branch exchange (PBX) to allow a plurality of subscriber telephone sets at one general location (for example, a business or a small town) to be provided with fixed cellular telephone service. As a single-line terminal, on the other hand, the fixed cellular terminal 24 provides a connection for a single subscriber telephone set at one given location (for example, a house). The fixed cellular terminal 24 may accordingly comprise either the Single-line or Multi-line Terminal manufactured by Ericsson for the CMS 8800 AMPS/D-AMPS Fixed Cellular telephone system configured in accordance with the present invention to provide an improved caller interface as will be described.

The fixed cellular terminal 24 comprises a radio unit (RU) 32, a line interface unit (LIU) 34 and a control unit (CU) 36. The radio unit 32 provides all the radio frequency communications functionality typically found in a mobile station 22 for a cellular telephone system. Thus, the radio unit 32 includes a tunable radio frequency transceiver device for accessing the radio frequency carriers (and the digital cellular system TDMA or CDMA time slots therein if applicable) for the control channels and voice channels provided within the air interface 26. The line interface unit 34 provides the functionality for interfacing the one or more connected standard telephone sets 12 to the radio unit 32. The control unit 36 manages the operation of the radio unit 32 and the line interface unit 34 to provide the signal conversions required to establish and terminate calls to and from the line interface unit 34 through the cellular network 14. The control unit 36 further manages all the necessary information required for establishing and authenticating calls over the cellular network 14.

Figure 2:
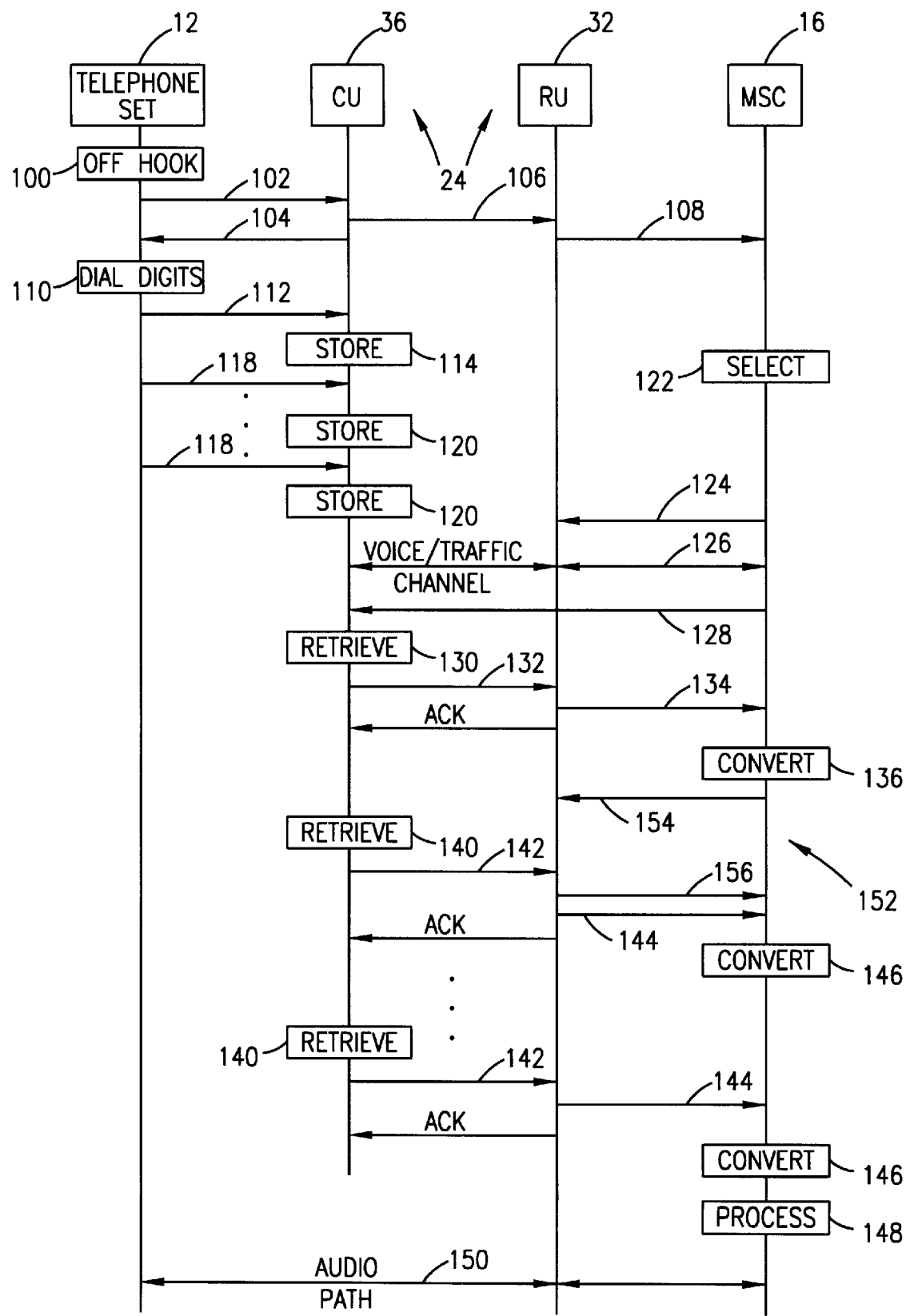
FIG. 2 is a ping-pong diagram illustrating the interactive operation of the components of the fixed cellular system of FIG. 1 to provide out of band burst digit signaling for a caller interface during call setup.

Reference is now made to FIG. 2 wherein there is shown a ping-pong diagram illustrating the interactive operation of the components of the fixed cellular system 10 of FIG. 1 to provide out of band burst digit signaling for a caller interface during call set-up. When the telephone set 12 goes off-hook 100 to initiate a call, an off-hook notification 102 is received by the control unit 36 of the fixed cellular terminal 24. In response thereto, the control unit 36 causes the line interface unit (not shown) of the fixed cellular terminal 24 to generate and apply a first dial tone 104 to the connection made with the off-hook telephone set 12. This first dial tone prompts calling party entry of called party telephone number digits. At the same time, the control unit 36 sends the off-hook notification 106 to the radio unit 32. A call set-up signal 108 is then generated by the radio unit 36 and transmitted over a first control channel of the air interface 26 to the mobile switching center 16 of the cellular network.

In the meantime, the calling party has begun to enter the digits of the called party telephone number (action 110). A first dialed digit 112 is received by the control unit 36 of the fixed cellular terminal 24 and stored (action 114). Responsive thereto, application of the first dial tone 104 to the telephone set 12 is terminated. Additional dialed digits 118 may also then be received by the control unit 36 of the fixed cellular terminal 24 and stored (action 120).

Responsive to receipt of the call set-up signal 108, the mobile switching center 16 selects 122 a voice/traffic channel of the air interface to carry the call and generates a set-up complete signal 124, identifying the selected voice/traffic channel, for transmission via the first control channel back to the radio unit 32 of fixed cellular terminal 24. A voice/traffic channel connection is then established between the mobile switching center 16 and the control unit 36 of the fixed cellular terminal 24. The mobile switching center 16 then applies a second dial tone 128 to the voice/traffic channel connection. An audio path connection through to the telephone set 12 is muted at this time by the control unit 36 to prevent confusing subscriber entered tones to be passed through to the mobile switching center 16 over the voice/traffic channel connection 126.

The second dial tone 128 is then received by the control unit 36 of the fixed cellular terminal 24. In response thereto, the control unit 36 retrieves the stored first dialed digit (action 130) and signals 132 that digit to the radio unit 32. The first digit is then sent 134 in a data message over a second control channel of the air interface 26 to the mobile switching center 16 of the cellular network. In the preferred embodiment, the control unit 36 continues to mute the audio path and the first digit is sent 134 by radio unit 32 in an out of band burst data communication transmitted over a logical control channel (such as a fast associated control channel—FACCH) that is supported by the voice/traffic channel connection 126. An appropriate acknowledgment (ACK) of radio unit 32 first digit processing is sent to the control unit 36. The first dialed digit data message is received by the mobile switching center 16 and converted to a corresponding dual tone multi-frequency (DTMF) tone (action 136). Responsive to receipt of the sent 134 first dialed digit, application of the second dial tone by the mobile switching center 16 to the voice/traffic channel connection 126 is terminated. Any additionally dialed and stored digits are then, on a one-by-one basis, retrieved (action 140), signaled 142 to the radio unit, sent 144 in a burst data message transmitted over the second control channel, acknowledged (ACKed), and converted to a corresponding dual tone multi-frequency (DTMF) tone (action 146). Again, the control unit 36 preferably continues to mute the audio path and the fast associated control channel (FACCH) is used to carry the additional digits in out of band burst data communications.

An appropriate time delay between each retrieval 130 and 140, as well as between successive retrievals 140, may be applied if necessary. The DTMF tones generated from the conversions 136 and 146 are then processed (action 148) in conventional manner to decode the dialed telephone number and complete the call to the called party. Following the expiration of a predetermined time period since the last dialed digit 110, the control unit 36 opens the audio path 150 through to the telephone set 12. The processing 148 of the tones is made on a one-by-one basis to identify improper or unauthorized digits or combinations of digits, in response to which the caller may be signaled of the same by the generation and application of a reorder tone (or voice message) to the audio path 150.

As the second control channel and, in particular, the preferred fast associated control channel (FACCH) may simultaneously need to be used for the transmission of other control messages, the radio unit 32 functions to prioritize data message transmissions in connection with the transmission of digit information to the mobile switching center 16. An example of this prioritization is shown generally at 152 where a second control channel message 154 is received by the radio unit 32 during the ongoing process of digit delivery. Priority is given by the radio unit 32 to other control messaging actions over control channel digit delivery. Accordingly, a response message 156 to the message 154 is first sent over the second control channel by the radio unit 32. Then, the burst data message containing the retrieved dialed digit is sent 144 over the same second control channel.

Figure 3:
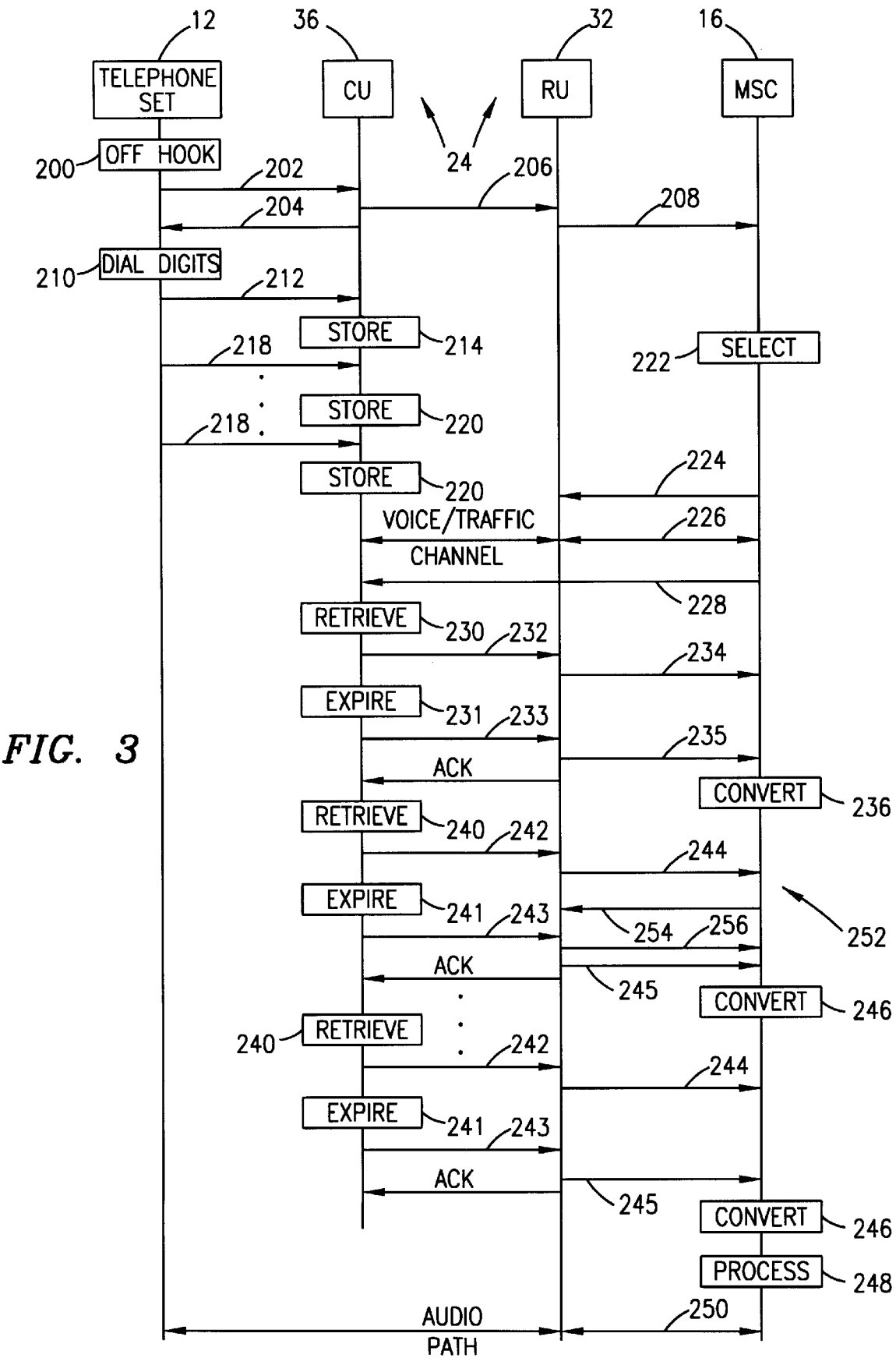
FIG. 3 is a ping-pong diagram illustrating the interactive operation of the components of the fixed cellular system of FIG. 1 to provide out of band continuous digit signaling for a caller interface during call set-up.

Reference is now made to FIG. 3 wherein there is shown a ping-pong diagram illustrating the interactive operation of the components of the fixed cellular system 10 of FIG. 1 to provide out of band continuous digit signaling for a caller interface during call set-up. When the telephone set 12 goes off-hook 200 to initiate a call, an off-hook notification 202 is received by the control unit 36 of the fixed cellular terminal 24. In response thereto, the control unit 36 causes the line interface unit (not shown) of the fixed cellular terminal 24 to generate and apply a first dial tone 204 to the connection made with the off-hook telephone set 12. This first dial tone prompts calling party entry of called party telephone number digits. At the same time, the control unit 36 sends the off-hook notification 206 to the radio unit 32. A call set-up signal 208 is then generated by the radio unit 36 and transmitted over a first control channel of the air interface 26 to the mobile switching center 16 of the cellular network.

In the meantime, the calling party has begun to enter the digits of the called party telephone number (action 210). A first dialed digit 212 is received by the control unit 36 of the fixed cellular terminal 24 and stored (action 214). Responsive thereto, application of the first dial tone 204 to the telephone set 12 is terminated. Additional dialed digits 218 may also then be received by the control unit 36 of the fixed cellular terminal 24 and stored (action 220).

Responsive to receipt of the call set-up signal 208, the mobile switching center 16 selects 222 a voice/traffic channel of the air interface to carry the call and generates a set-up complete signal 224, identifying the selected voice/traffic channel, for transmission via the first control channel back to the radio unit 32 of fixed cellular terminal 24. A voice/traffic channel connection 226 is then established between the mobile switching center 16 and the control unit 36 of the fixed cellular terminal 24. The mobile switching center 16 then applies a second dial tone 228 to the voice/traffic channel connection 226. An audio path connection through to the telephone set 12 is muted at this time by the control unit 36 to prevent confusing subscriber entered tones to be passed through to the mobile switching center 16 over the voice/traffic channel connection 226.

The second dial tone 228 is then received by the control unit 36 of the fixed cellular terminal 24. In response thereto, the control unit 36 retrieves the stored first dialed digit (action 230) and signals 232 a start digit to the radio unit 32. The first digit is then sent 234 as a start digit data message over a second control channel of the air interface 26 to the mobile switching center 16 of the cellular network. When a digit transmission timer expires (action 231), the control unit 36 signals 233 a stop digit to the radio unit 32. A stop first digit data message is then sent 235 over the second control channel of the air interface 26 to the mobile switching center 16 of the cellular network. In the preferred embodiment, the control unit 36 continues to mute the audio path and the start and stop digit messages are sent 234 and 235 by radio unit 32 as an out of band data communication over a logical control channel (such as a fast associated control channel— FACCH) that is supported by the voice/traffic channel connection 226. An appropriate acknowledgment (ACK) of radio unit 32 digit processing is sent to the control unit 36. The start 234 and stop 235 digit data messages are received by the mobile switching center 16, with the identified digit converted to a corresponding dual tone multi-frequency (DTMF) tone (action 236). Responsive to receipt of the first dialed digit, application of the second dial tone 228 by the mobile switching center 16 to the voice/traffic channel connection is terminated. Any additionally dialed and stored digits are then, on a one-by-one basis, retrieved (action 240), start 242 and stop 243 digit signaled to the radio unit (as specified by timer 241), start 244 and stop 245 digit data message transmitted over the second control channel, acknowledged (ACKed), and converted to a corresponding dual tone multi-frequency (DTMF) tone (action 246). Again, the control unit 36 preferably continues to mute the audio path and the fast associated control channel (FACCH) is used to carry the start and stop digit messages relating to the additional digits as out of band data communications. The DTMF tones generated from the conversions 236 and 246 are then processed (action 248) in conventional manner to decode the dialed telephone number and complete the call to the called party. Following the expiration of a predetermined time period since the last dialed digit 210, the control unit 36 opens the audio path 250 through to the telephone set 12. The processing 248 of the tones is made on a one-by-one basis to identify improper or unauthorized digits or combinations of digits, in response to which the caller may be signaled of the same by the generation and application of a reorder tone (or voice message) to the audio path 250.

As the second control channel and, in particular, the preferred fast associated control channel (FACCH) may simultaneously need to be used for the transmission of other control messages, the radio unit 32 functions to prioritize data message transmissions in connection with the transmission of digit information to the mobile switching center 16. An example of this prioritization is shown generally at 252 where a second control channel message 254 is received by the radio unit 32 following transmission of the start digit data message 244 (or 234) relating to digit delivery. Priority is given by the radio unit 32 to other control messaging actions over control channel digit delivery. Accordingly, a response message 256 to the message 254 is first sent over the second control channel by the radio unit 32. Then, the stop digit message 245 (or 235) is sent over the same second control channel.

Figure 4:
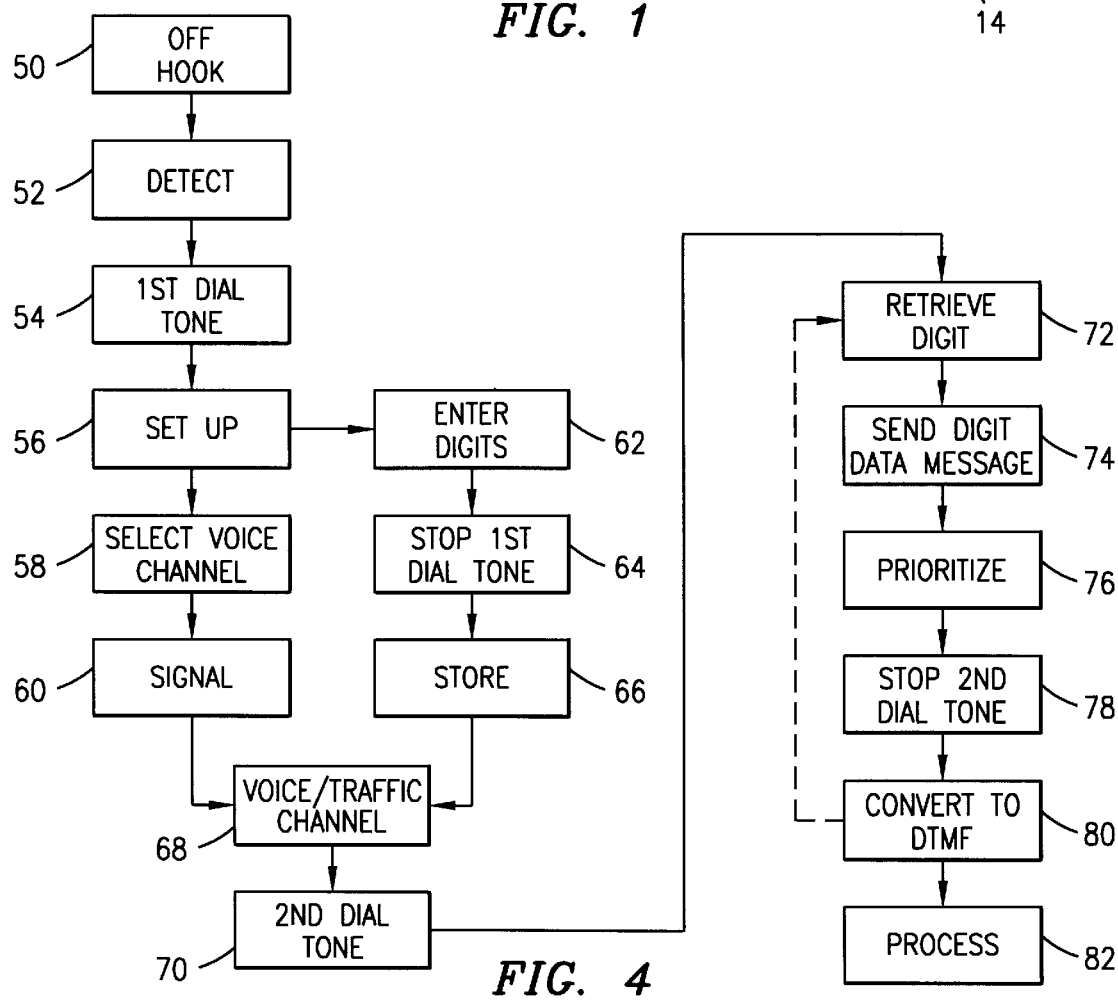
FIG. 4 is a flow diagram illustrating a method of operation for the fixed cellular telephone system of the present invention to provide out of band digit signaling for a caller interface during call set-up.

Reference is now made to FIG. 4 wherein there is shown a flow diagram illustrating a method of operation for the fixed cellular telephone system of the present invention to provide out of band digit signaling for a caller interface during call set-up. At step 50, a standard telephone set is taken off-hook by a caller to initiate a call. This off-hook event is detected by the associated fixed cellular terminal in step 52. Responsive to the detection of the off-hook event, the fixed cellular terminal generates a first dial tone in step 54 which is applied to the off-hook telephone set. A call set-up signal is then sent in step 56 by the fixed cellular terminal to the serving cellular telephone network over a first control channel. The serving cellular telephone network then selects a voice/traffic channel in step 58 to carry the initiated call. A signal identifying the selected voice/traffic channel is then transmitted in step 60 back over the first control channel to the fixed cellular terminal. In the meantime, the calling party has begun to enter digits of the called party telephone number in step 62. Responsive to a first entered one of those digits, application of the first dial tone is terminated in step 64. The entered digits are stored in step 66. Responsive to the set-up response signal received from the cellular telephone network, a voice/traffic channel connection is established in step 68 between the cellular telephone network and the fixed cellular terminal. A second dial tone is then applied to the voice/traffic channel connection by the cellular telephone network in step 70. Responsive to the second dial tone, the fixed cellular terminal, on a one-by-one basis, retrieves stored digits of the dialed telephone number in step 72 and sends an identification of the digits in step 74 to the cellular telephone network using a data message transmission over a second control channel. In particular, the digit identifications are sent as an out of band burst or continuous data communication over a logical control channel (such as a fast associated control channel— FACCH) that is also supported by the voice/traffic channel connection. Prioritization of other second control channel communications over the digit transmissions, if necessary, is given in step 76. Responsive to a first received one of those digits, application of the second dial tone by the cellular telephone network is terminated in step 78. The digits identified in the data messages are converted to dual tone multi-frequency (DTMF) tones in step 80, with the tones processed in step 82 in conventional manner to decode the dialed telephone number and complete the initiated call to the called party. This processing operation includes monitoring for expiration of a timer either before receipt of a first DTMF tone, or between receipt of successive DTMF tones, as well as identifying whether the number being dialed is an improper or unauthorized number. If the timer expires or the number is improper or unauthorized, a reorder (or congestion or alert) tone or voice message, as appropriate, is applied to the voice/traffic channel connection for presentation to the calling party through the off-hook telephone set when the audio path is opened.

Although a preferred embodiment of the method and apparatus of the present invention has been illustrated in the accompanying Drawings and described in the foregoing Detailed Description, it will be understood that the invention is not limited to the embodiment disclosed, but is capable of numerous rearrangements, modifications and substitutions without departing from the spirit of the invention as set forth and defined by the following claims.

What is claimed is:

1. In a fixed cellular system, a method for call set-up comprising the steps of:

detecting an off-hook event for a standard telephone set;

transmitting a call set-up signal responsive to the detected off-hook event over a first control channel of a cellular air interface;

responsive to cellular telephone system receipt of the call set-up signal, selecting a voice/traffic channel of the cellular air interface to carry the call;

establishing a voice/traffic channel connection between the cellular telephone system and the telephone set;

transmitting over a second control channel of the cellular air interface data messages identifying digits of a telephone number of a called party for the call, wherein the second control channel comprises a logical control channel supported within the established voice/traffic channel connection; and processing of the second control channel transmitted digit data messages by the cellular telephone system to complete the call to the called party.

2. The method of claim 1 further comprising the step of applying a first dial tone to the telephone set prompting entry of the telephone number for the called party.

3. The method of claim 2 further comprising the step of applying by the cellular system of a second dial tone to the voice/traffic channel connection prompting transmission of the data messages.

4. The method of claim 1 wherein the step of processing comprises the step of processing the digits identified in the transmitted data messages to identify improper or unauthorized digits or combinations of digits in the telephone number.

5. The method of claim 1 wherein the step of processing comprises the step of processing the digits identified in the transmitted data messages to decode the telephone number of the called party and complete the call.

6. The method of claim 1 wherein the step of processing comprises the steps of:

converting the digits identified in the data messages to dual tone multi-frequency (DTMF) tones;

processing the tones to identify improper or unauthorized digits or combinations of digits; and processing the tones to decode the telephone number of the called party and complete the call.

7. In a fixed cellular system, a method for call set-up comprising the steps of:

detecting an off-hook event for a standard telephone set;

transmitting a call set-up signal responsive to the detected off-hook event over a first control channel of a cellular air interface;

responsive to cellular telephone system receipt of the call set-up signal, selecting a voice/traffic channel of the cellular air interface to carry the call;

establishing a voice/traffic channel connection between the cellular telephone system and the telephone set;

transmitting over a second control channel of the cellular air interface data messages identifying digits of a telephone number of a called party for the call, wherein the step of transmitting over the second control channel further comprises the step of muting an audio path connection to the standard telephone set during digit data message transmission; and processing of the second control channel transmitted digit data messages by the cellular telephone system to complete the call to the called party.

8. A fixed cellular telephone system, comprising:

a standard telephone set into which digits of a telephone number of a called party are entered;

a fixed cellular terminal connected to the telephone set and including means responsive to the entry of the digits for transmitting data messages identifying the entered digits over a control channel of a cellular radio frequency air interface; and a cellular telephone system including:

means for establishing a voice/traffic channel connection between the cellular telephone system and the fixed cellular terminal, the control channel for carrying digit data message transmissions comprising a logical control channel supported within the voice/traffic channel; and means responsive to receipt of the transmitted digit data messages for completing the call to the called party.

9. The fixed cellular system of claim 8 wherein fixed cellular terminal includes means for applying a first dial tone to the telephone set prompting entry of the digits of the telephone number of the called party.

10. The fixed cellular system of claim 9 wherein the cellular telephone system further includes means for applying a second dial tone to the voice/traffic channel connection prompting fixed terminal transmission of the data messages.

11. The fixed cellular system of claim 8 wherein the means for completing the call comprises:

means for converting the digits identified in the data messages to dual tone multi-frequency (DTMF) tones; and means for analyzing the tones to identify instances of improper or unauthorized digits or combinations of digits in the telephone number.

12. The fixed cellular system of claim 8 wherein the means for completing the call comprises:

means for converting the digits identified in the data messages to dual tone multi-frequency (DTMF) tones; and means for analyzing the tones to decode the telephone number and complete a call connection to the called party.

13. A fixed cellular telephone system, comprising:

a standard telephone set into which digits of a telephone number of a called party are entered;

a fixed cellular terminal connected to the telephone set and including means responsive to the entry of the digits for transmitting data messages identifying the entered digits over a control channel of a cellular radio frequency air interface and means for muting an audio path connection to the standard telephone set during digit data message transmission; and a cellular telephone system including:

means for establishing a voice/traffic channel connection between the cellular telephone system and the fixed cellular terminal, the voice/traffic channel connection supporting the control channel for carrying digit data message transmissions; and means responsive to receipt of the transmitted digit data messages for completing the call to the called party.

14. A fixed cellular terminal for use in a fixed cellular communications system and for connection to a standard telephone set, comprising:

means for detecting an off-hook event concerning the telephone set at the initiation of a call;

means responsive to the detected off-hook event for transmitting a call set-up signal over a first control channel of a cellular radio frequency air interface to a cellular telephone system;

means responsive to completion of the call set-up for establishing a voice/traffic channel connection between the fixed cellular terminal and the cellular telephone system; and means for transmitting data messages identifying digits of a telephone number entered into the telephone set to the cellular telephone system over a second control channel of the cellular radio frequency air interface, wherein the second control channel comprises a logical control channel supported within the established voice/traffic channel connection.

15. The fixed cellular terminal of claim 14 further including means for applying a dial tone to the off-hook telephone set prompting entry of the telephone number.

16. The fixed cellular terminal of claim 14 further including:

means for storing digits of the telephone number entered at the off-hook telephone set; and means for retrieving from storage the digits of the telephone number for transmission over the second control channel.

17. The fixed cellular system of claim 14 wherein the means for transmitting further includes means for muting an audio path connection to the standard telephone set during digit data message transmission.

18. A method for setting-up a call in a fixed cellular telephone system, comprising the steps of:

transmitting, in response to an off-hook condition of a telephone set, a call set-up signal over a first control channel of a cellular telephone system radio frequency air interface;

selecting a voice/traffic channel of the cellular telephone system radio frequency air interface to carry the call;

establishing a voice/traffic channel connection for the call; and transmitting data messages identifying digits of a telephone number for a called party to the cellular telephone system over a second control channel of the cellular telephone system radio frequency air interface, wherein the second control channel comprises a logical control channel supported within the established voice/traffic channel connection.

19. The method of claim 18 further including the step of applying a first dial tone prompting caller entry of the digits of the telephone number.

20. The method of claim 18 further including the step of applying a second dial tone to the selected voice channel prompting transmission of the digit data messages to the cellular telephone system.

21. The method of claim 18 further including the step of converting the digits identified in the transmitted data messages to dual tone multi-frequency (DTMF) tones.

22. The method of claim 21 further including the step of processing the tones to decode the telephone number and complete connection of the call.

23. The method of claim 21 further including the step of processing the tones to identify instances of improper or unauthorized digits or combinations of digits in the telephone number.

24. The method of claim 18 wherein the step of transmitting data messages includes the step of muting an audio path connection to the telephone set during digit data message transmission.

* * * * *